(12) United States Patent
Min et al.

(10) Patent No.: US 6,203,709 B1
(45) Date of Patent: Mar. 20, 2001

(54) IRON (III)-DOPED CALCIUM ALGINATE GEL SORBENTS FOR SORPTION OF ARSENATE AND SELENITE

(75) Inventors: Joon H. Min; Janet G. Hering, both of Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/191,423

(22) Filed: Nov. 12, 1998

Related U.S. Application Data (60) Provisional application No. 60/084,935, filed on May 11, 1998.

(51) Int. Cl.$^7$ ..................................................... C02F 1/28
(52) U.S. Cl. ............................................ 210/683; 210/911
(58) Field of Search .................................. 210/679, 683, 210/684, 181, 263, 911

(56) References Cited

U.S. PATENT DOCUMENTS

| | | | |
|---|---|---|---|
| 5,144,016 | 9/1992 | Skjak-Braek et al. | ............... 536/3 |
| 5,385,741 | * 1/1995 | Rinn et al. | ................ 210/681 |
| 5,453,201 | * 9/1995 | Etzel et al. | ................ 210/679 |
| 5,520,819 | 5/1996 | Asahi et al. | ................ 210/727 |
| 5,563,186 | 10/1996 | Thompson | ................ 523/130 |
| 5,567,451 | 10/1996 | Rinn et al. | ................ 426/13 |
| 5,596,084 | 1/1997 | Sanderson et al. | ............. 536/3 |

OTHER PUBLICATIONS

Min, J.H. et al., "Arsenate Sorption by Fe(III)–Doped Alginate Gels," *Wat. Res.* vol. 32, No. 5, pp. 1544–1552, 1998.

Min, J.H. et al., "Arsenate, Selenite, and Chromate Sorption by Fe(III)–Doped Alginate Gels," *Advances in Environmental Research*, 2 (2) 1998, 207–217.

Jang, L.K. et al., "Recovery of Copper and Cobalt by Biopolymer Gels," *Biotechnology and Bioengineering*, vol. 37, pp. 266–273 (1991).

* cited by examiner

Primary Examiner—Ivars Cintins
(74) Attorney, Agent, or Firm—Oppenheimer Wolff & Donnelly LLP (57) ABSTRACT

Systems and methods for removing oxyanionic contaminants, such as arsenate (As(V)) and selenite (Se (IV)), from polluted water. The system utilizes calcium alginate which has been doped with ferric iron. The system is operated as either a batch-type or continuous feed purifier. A dehydrator is included for drying spent absorbent beads to form a dry disposable solid waste product.

8 Claims, 4 Drawing Sheets

IRON (III)-DOPED CALCIUM ALGINATE GEL SORBENTS FOR SORPTION OF ARSENATE AND SELENITE

This application claims the benefit of provisional application Serial No. 60/084,935, filed on May 11, 1998.

The U.S. Government has certain rights in this invention pursuant to Grant Numbers BES-9696210, BES-9696136, BES-9258431 and BES-9553208 awarded by the National Science Foundation.

BACKGROUND OF THE INVENTION

1. Field of the Invention

The present invention relates generally to the use of alginates in water purification systems. More particularly, the present invention involves using doped alginates to remove oxyanions such as arsenic (V) and selenium (IV) oxyanions from polluted water.

2. Description of Related Art

The publications and other reference materials referred to herein to describe the background of the invention and to provide additional detail regarding its practice are hereby incorporated by reference. For convenience, the reference materials are numerically referenced and grouped in the appended bibliography.

Of the many toxic materials that may be present as contaminants in natural waters and wastewaters, a few (specifically arsenic (V), chromium (VI), and selenium (IV) occur as oxyanions. Removal of arsenic is, in particular, an issue of increasing concern. Reevaluation of the current Maximum Contaminant Level (MCL) for arsenic is mandated under the 1996 re-authorization of the Safe Drinking Water Act. A decrease in the current standard (50 $\mu$g/l) would impact the required levels of treatment not only for potable water, but also for hazardous wastewaters and effluents under the Resource Conservation and Recovery Act.

Arsenic is a major contaminant of concern at many Superfund sites (1, 2). Arsenic containing wastestreams are generated in the microelectronics industry due to the use of arsenic in the form of gallium arsenide (GaAs) for the manufacturing of semiconductor devices (4). The average concentration of arsenic in wastewater at facilities which produce GaAs has been estimated to be 2.4 mg/l (5).

For arsenic-contaminated wastestreams, various physical/chemical treatment technologies have been applied for contaminant removal. Arsenic-contaminated water collected during clean up at a former pesticide facility was treated in a full-scale process involving co-precipitation/adsorption with ferric chloride, filtration and carbon adsorption (6).

In pilot-scale studies using electrochemically generated $Fe^{2+}$ and hydrogen peroxide, arsenic was efficiently removed from contaminated waters at both a Superfund site and a wood-preserving facility (1). Other processes, such as adsorption onto activated carbon (7, 8) or fly-ash (9) have been tested at bench scale.

Many of these processes generated a significant quantity of sludges or other solid wastes. In some cases, these materials had to be disposed of as hazardous waste. In some applications, selective removal of oxyanions may provide options for more economical treatment of wastestreams. For example, by reducing subsequent sludge disposal costs.

At the bench scale, biosorbents have been tested primarily for removal of heavy metal cations, which are removed preferentially to alkali and alkaline earth metals and anionic species (10). Alginic acid has been shown to be effective at removing many cationic metals from solution including $Pb^{2+}$ and $Cu^{2+}$ (11), $UO^{2+}_2$ (12). $Cu^{2+}$ (13), $Cu^{2+}$, $Zn^{2+}$, $Cd^{2+}$, and $Ni^{2+}$, (14), $Nd^{3+}$ and $Yb^{3+}$ (15), and $^{226}Ra$ (16).

Pretreatment or doping of an anionic biosorbent, such as alginic acid, with cations allows (indirect) interaction between the biosorbent and anionic contaminants. Charged polysaccharides, such as sodium alginate, often form hydrogels in the presence of cations (18), the gel characteristic depend on the specific cation. Metal recovery (Co, Cu, As, Fe, Mg, Al, Ca) from an acidic (pH 2–3) cobalt ore leachate with alginic acid has been investigated by Jang et al. (17).

As is apparent from the above, there is a continuing need to provide efficient and economical systems for purifying polluted waters. Such systems are especially needed for removing hazardous oxyanionic pollutants, such as arsenic and selenium oxyanions.

SUMMARY OF THE INVENTION

In accordance with the present invention, a system is provided for removing arsenic (V) and selenium (IV) oxyanions from polluted water utilizing calcium cross-linked alginate which has been further doped with ferric iron. It was discovered that doping calcium alginate with ferric iron produced a sorption media which is effective in sorbing arsenic (V) and selenium (IV) from polluted water. Once the iron-doped calcium alginate is saturated with the pollutants, the doped alginate is dehydrated to form a solid waste. Depending on the pertinent state and/or federal criteria (e.g. total arsenic-content and/or leachability), the dehydrated arsenic-containing alginate solid may be acceptable for disposal as a non-hazardous substance.

Systems for removing arsenate and selenite include a sorption vessel which includes an inlet through which the polluted water is introduced into an oxyanion sorption zone and a purified water outlet through which water having reduced levels of oxyanionic pollutants (i.e., arsenate and selenite) exits the sorption zone. As a feature of the present invention, a sorption media is located within the oxyanion sorption zone. The sorption media includes calcium cross-linked alginate which is further doped with ferric iron, wherein the amount of ferric iron present in the sorption media is between about 0.5 percent and about 4 percent by weight of the wet doped calcium alginate or up to 60% of the dry weight.

The sorption vessel may be used in batch-type processes wherein a given amount of water is introduced into the sorption vessel and agitated therein with a suitable agitator to ensure intimate mixing of the sorption media and polluted water. Once purified, the water is then removed as a batch from the sorption vessel. The sorption vessel may also be operated in a continuous manner wherein polluted water continuously flows into the sorption vessel inlet and purified water continually flowing out of the sorption vessel outlet. As the water passes through the vessel, it intimately contacts the sorption media either as a fixed or fluidized bed. The systems of the present invention may also include a dehydrator for dehydrating the spent sorption media to form a disposable waste product.

The present invention is particularly well suited in situations where an efficient sorption system is required for removing arsenate and selenite that has been introduced into sensitive environments from various human activities, such as mining, smelting, pesticide manufacture and use. In addition, the present invention is well suited for use in treating industrial waste streams to prevent the need to remediate contaminated ground water.

The above described and many other features and attendant advantages of the present invention will become better understood by reference to the following detailed description when taken in conjunction with the accompanying drawings.

BRIEF DESCRIPTION OF THE DRAWINGS

FIG. 3a–c. Schematics of Ca—Fe gel bead formation with sodium alginate.

FIG. 6 is the breakthrough curve for sorption of As(V) to Ca—Fe alginate gel beads. Influent As(V) concentration was 40 mg/L. Column setup (8 mL glass column, void volume =3.17 mL, flow rate =2.5 mL/hr (up flow), the residence time=1 hr and 15 min). Reaction conditions (0.5 mM acetic acid, 5 mM $NaNO_3$, pH 4, 1017 Ca—Fe beads).

DETAILED DESCRIPTION OF THE INVENTION

Figures 1, 2:
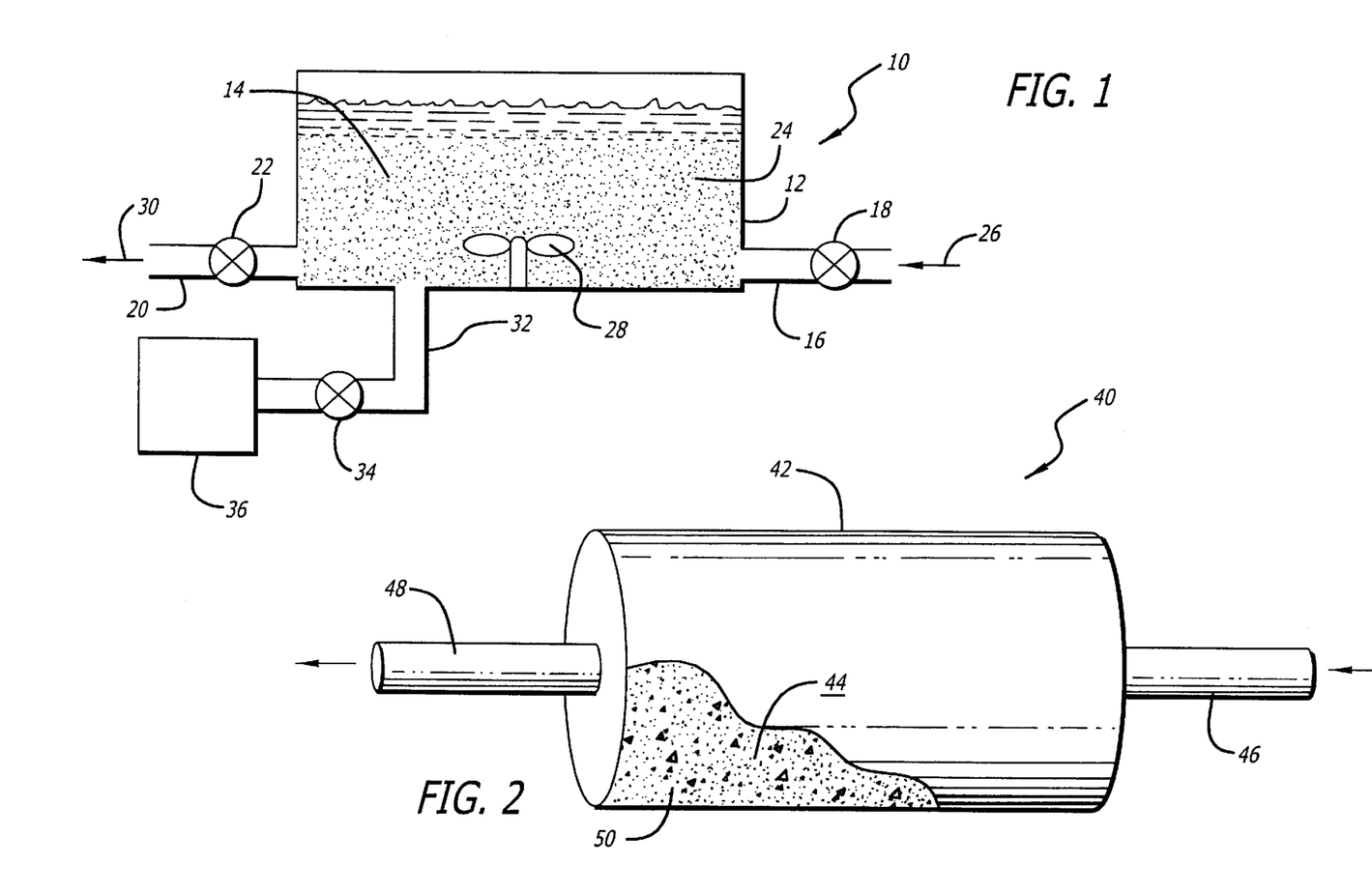
FIG. 1 is a schematic representation of a pollution removal system in accordance with the present invention.
FIG. 2 is a partially schematic representation of a pollution removal system in accordance with the present invention which is designed for continuous flow removal of arsenate and selenite from polluted water.

An exemplary system for removing oxyanionic pollutants from polluted water in accordance with the present invention is shown generally at 10 in FIG. 1. The system 10 includes a sorption vessel 12 which defines an oxyanion sorption zone 14. The sorption vessel 12 includes a polluted water inlet 16 which includes a valve 18 for controlling the flow of polluted water into the vessel 12. The sorption vessel 12 further includes a purified water outlet 20 through which water having oxyanionic pollutants removed therefrom exits the sorption vessel 12. Outflow of water through outlet 20 is controlled by valve 22. An important requirement for this system is that sorption media 24 be located within the sorption vessel 12.

The sorption media is capable of removing arsenic (V) and selenium (VI) oxyanions from polluted waters and is made from calcium cross-linked alginate (also referred to herein alternatively as calcium alginate) which has been doped with ferric iron. Preferably, the iron-doped calcium alginate is in the form of beads which have average diameters on the order of from 1 to 6 mm. Beads of this size are preferred because they are more easily separated from water once they have become saturated with the arsenate or selenite pollutant. Smaller beads in the submm range may be more effective in some cases provided that suitable procedures are provided for separation of the spent beads or powder from the purified water.

The iron-doped calcium alginate may also be utilized in forms other than beads. For example, the iron-doped calcium alginate may be deposited on any suitable support surface provided that intimate contact between the polluted water and iron-doped calcium alginate is achieved. Depending upon the dispensing setup used, the iron-doped calcium alginate also may be synthesized as a fiber, hollow fiber or membrane. Iron-doped calcium alginate beads are preferred, however, because they are easy to make in large quantities and provide efficient sorption of the pollutants. In addition, as mentioned above, the spent beads can be easily separated from purified water by sedimentation or physical separation which may or may not be enhanced by centrifuging or other well-known solid-liquid separation techniques.

The system 10 may be operated either as a batch purification system or continuous flow purification system. For batch-type operation, the polluted water, as represented by arrow 26 is introduced through inlet 16 by opening valve 18. Once the sorption zone 14 has been filled with water and sorption media, the valve 18 is closed. An agitator 28 is utilized to continually mix the sorption media and polluted water over a predetermined residence time. The residence time for the polluted water in the sorption zone 14 is determined by a number of factors including the concentration of arsenate and selenite in the water, total volume of contaminated water, as well as the size and amount of sorption beads present in the reactor. The agitator 28 can be an electrically-driven stirring device or any other conventional mechanical agitation system or sparger system. After a suitable residence time, the purified water is then transferred through the purified water outlet 20 by opening valve 22. Suitable screens or filters are provided for preventing flow of the sorption beads out through outlet 20.

For continuous operation, valves 18 and 22 are left open and polluted water is introduced into the system as represented by arrow 26 and purified water is continually removed from the system as represented by arrow 30. In such continuous operation systems, the flow rate of polluted water through the sorption zone must be controlled so that a sufficient residence time in the sorption zone 14 is provided so that complete sorption is possible.

The iron-doped calcium alginate beads must be replaced when they become saturated with arsenate and/or selenite pollutants. The spent sorbent beads are removed from the vessel through line 32 as controlled by valve 34. The spent beads enter a dehydrator shown schematically at 36 where the beads are dried to remove substantially all of the residual water. The dehydrated beads are removed from the dehydrator or dehydration system 36 and transported to a solid waste dumpsite for disposal if relevant state and/or federal criteria permits.

An alternate purification system in accordance with the present invention is shown generally at 40 in FIG. 2. The system 40 is designed for in-line use for continuous purification of waters polluted with arsenate and selenite. This system includes a sorption vessel 42 which defines an oxyanion sorption zone 44. Polluted water enters into the sorption zone 44 through polluted water inlet 46. The purified water exits the sorption zone 44 through purified water outlet 48. This particular system 40 is designed for continuous in-line pollutant removal, however, it may be used for batch removal processes if desired. The iron-doped calcium alginate beads are shown at 50. The sorbent beads 50 are preferably packed to a sufficient density to ensure complete removal of pollutants during the residence time of polluted water as it passes the sorption zone.

Figures 3A, 3B, 3C:
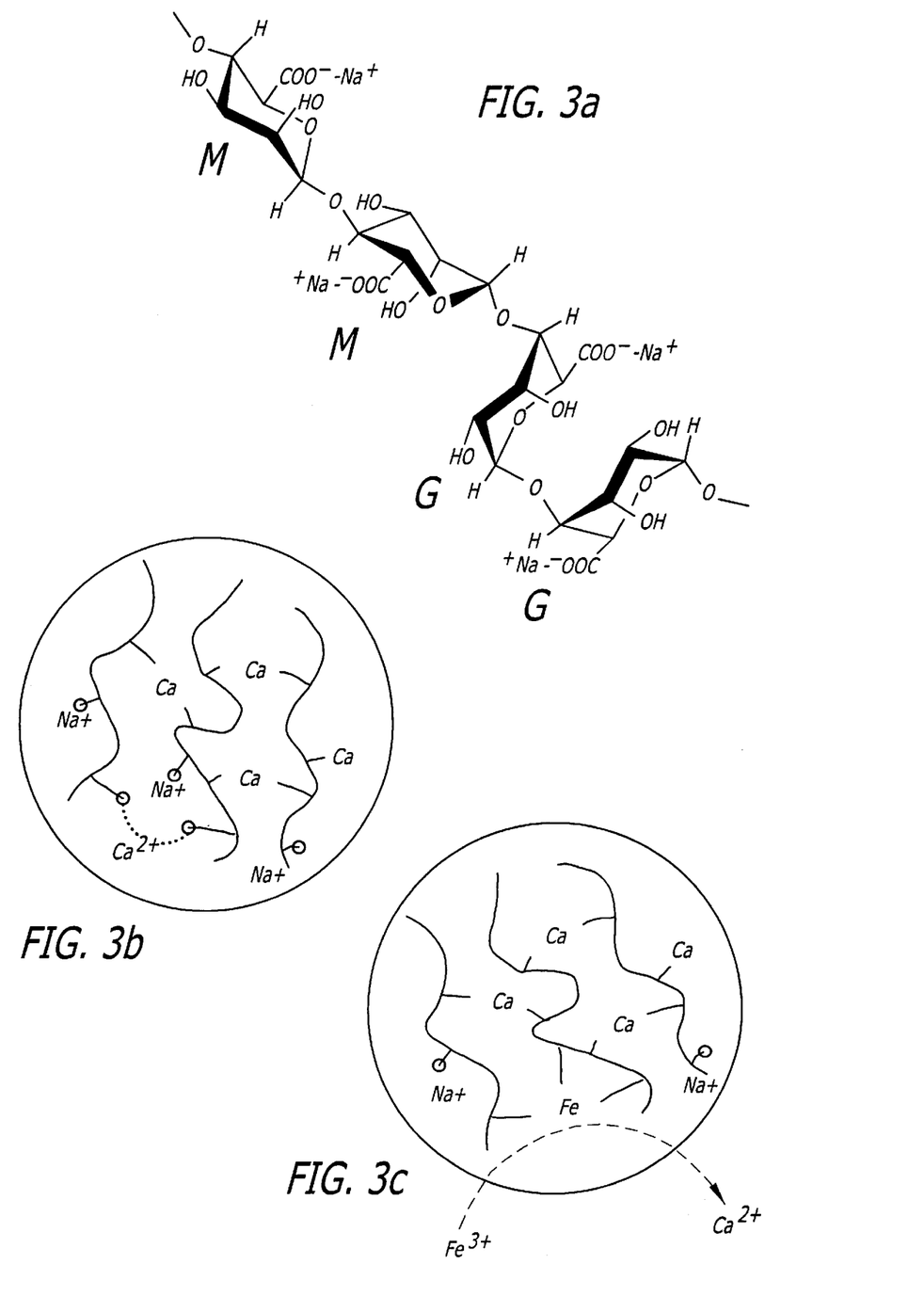
(FIG. 3a) Sodium alginate chain showing conformation of M and G units.
(FIG. 3b) Ca bead is produced by forming junctions with Ca.
(FIG. 3c) $Fe^{3+}$ displaces loosely bound Ca to produce Ca—Fe beads.

The sorbent media in accordance with the present invention is preferably made in a two-step process. In general, sodium alginate solution (1% to 6% w/v) is added drop-wise to a solution of calcium chloride to form beads in which substantially all of the sodium ions are replaced by calcium. The beads are referred to herein either as calcium-doped alginate beads or simply calcium alginate beads. The droplet size of the sodium alginate solution can be varied to make calcium alginate beads having a wide range of diameters. Beads which have diameters in the range of 1 to 6 mm are preferred for use in the present purification systems. The structure of sodium alginate is shown in FIG. 3$a$ at the formation of calcium-doped sodium alginate being shown in FIG. 3$b$. Sufficient calcium must be provided in the solution to replace most of the sodium ions present in the sodium alginate and to form crosslinking with alginate, such that the alginate is saturated with calcium ions. A small amount of sodium ions may, however, remain in the calcium alginate. The amount of calcium present in the sorption beads will be between about 1 percent and 6 percent by weight of the total wet bead weight.

The second step in synthesis of the sorption media involves doping the calcium alginate with ferric iron. This is accomplished by exposing the beads to a solution of ferric chloride or other aqueous solution containing ferric iron ions. The iron doping of the calcium alginate beads is shown schematically in FIG. 3$c$. The iron solution concentration should be sufficient to allow saturation of the calcium alginate beads. Preferably, the amount of ferric iron present in the sorption beads will be between about 0.5 percent and about 4 percent by weight of the total wet bead weight or up to 60% of the dry weight. The majority (i.e. 97%) of the wet media weight is water. For example, the wet weight of a 2 mm bead is about 4.2 mg, and the dry weight for the same bead is 126 $\mu$g. Lower amounts of iron are not effective for efficient pollutant removal. The preferred molar ratio of Ca to Fe in the beads is from about 3 to 10.

In the following examples, iron(III)-doped calcium alginate was used as a sorbent to remove arsenate and selenite from aqueous solution. Hydrogel beads of alginic acid (an anionic linear polysaccharide composed of $\alpha$-L-guluronic acid and $\beta$-D-mannuronic acid monomers) were prepared by dispensing the polymer solution dropwise into a 0.1 M $CaCl_2$ solution. Gel formation under these conditions and the properties of alginate gels formed with divalent cations have been discussed elsewhere (13, 17, 18, 19). The calcium alginate beads were resuspended in 0.1 M $FeCl_3$ which resulted in substantial replacement of calcium with iron(III) as shown schematically in FIGS. 3$a$–$e$ and described in Ref. No. 19.

The iron(III) substitution is required for sorption of arsenic (V) and selenium (IV) oxyanions. Although iron (III)-alginate beads can be prepared in a single step from sodium alginate, their physical properties are less desirable than those of the mixed calcium-iron(III)-alginate (Ca—Fe) beads in accordance with the present invention.

Sorption of As(V) and Se(IV) oxyanions by the Ca—Fe gel beads was demonstrated in batch and column studies. Although regeneration of the sorbent does not appear to be effective using As(V) or Se(IV) free solution at pH 7, dehydration of the spent Ca—Fe beads may allow for cost-effective transport, storage, or disposal of these hazardous substances. Dehydration is a preferred method of disposal over regeneration using alternative regenerant solution.

Materials and Methods

Reagents and Stock Solutions. Sodium alginate (low viscosity grade, 250 cps at 25° C. and 2% w/v) was used without further purification. All other chemicals were reagent grade and used as received. All solutions were prepared with water purified by reverse osmosis and deionized using a Millipore System (Milli Q following Milli RO), referred to here as Milli Q water. The selenite, selenate, chromate, and arsenate stock solutions (1.000 g/ L) were prepared from sodium selenite ($Na_2SeO_3.5H_2O$), sodium selenate ($Na_2SeO_4.10H_2O$), potassium chromate ($K_2CrO_4$), and sodium arsenate heptahydrate ($Na_2HAsO_4.7H_2$), respectively, dissolved in Milli Q water. Secondary standard solutions for calibration samples (1.000 mg/L) and spiking were freshly prepared for each experiment from the 1.000 g/L stock solutions by dilution with Mill Q water. The phosphate (0.01 M) stock solutions were prepared from $NaH_2PO_4.H_2O$ dissolved in Milli Q water. Calcium and iron solutions (0.100 M) used in gel synthesis were prepared from $CaCl_2.2H_2O$ and $FeCl_3.6H_2O$ respectively by dissolution of the salts in Milli Q water.

Gel Beads Synthesis. Spherical gel beads (1–6 mm size range in diameter) were formed by dispensing the 2 to 6% w/v alginate solution dropwise into 1 L of 0.1 M $CaCl_2$. The beads were allowed to cure fully in the calcium solution for 3 days. Ca beads were then washed with Milli Q water using a continuous washing system (~15 ml/min) for 3 days and then equilibrated with 0.100 M $FeCl_3$ (3 days) to achieve partial substitution of Fe(lII) for Ca. The Ca—Fe alginate beads washed continuously with 1 mM HCl for 3 days before use. A more detailed description of the Ca—Fe gel bead synthesis is provided in Ref. No. 19.

Conditions and Apparatus for Batch Sorption Examples. All of the batch examples were done at pH 4 using an acetate buffer (0.5 mM) and a background electrolyte of 5 mM $NaNO_3$ unless otherwise specified. The pH of the solution was adjusted with either $HNO_3$ (0.1 N) or NaOH (0. 1N) solution, and the pH was measured with an Orion 720A pH meter. In order to isolate the swelling or shrinking effects from the sorption process, the Ca—Fe beads used were pre-equilibrated in specified pH solutions before oxyanion batch or column examples. For each replicate in the batch examples, 5 beads (unless otherwise specified) were equilibrated in acetate buffer solution at the specified pH overnight. After the surface moisture of the beads was wiped off, they were transferred to 85 ml polycarbonate centrifuge tubes which were used as reactors with 50 ml of solution as reaction volume. Then, As(V), Se(IV) or Cr(VI) spikes (to final concentrations of 4.00 $\mu$g/L to 10.0 mg/L) were added and reacted on a wrist action shaker. After the specified reaction times, the beads were removed from the reactors to stop further reaction of oxyanions with the beads, and the supernatants and/or gel beads were analyzed. All examples were run in duplicate.

Conditions and Apparatus for Column Examples. An 8 mL glass column, with 1 cm inner diameter and 10 cm length, was packed with about 1000 Ca—Fe gel beads of 2 mm diameter or about 8000 beads with 1 mm diameter. The void volume of the packed column was approximately 3.17 mL. The column was run in an upflow mode using a peristaltic pump with a flow rate of 2.5 to 12 mL/hr and an influent As(V) concentration of 40 to 60 mg/L. The calculated residence time of the column was 0.25 to 1.25 hr; samples were collected hourly using a fraction collector.

Analytical Measurements. The sorbed (gel phase) concentration of P, Se, Cr, As, and Fe were measured by Inductively Coupled Plasma Mass Spectrometry (ICP-MS)

for the samples with initial oxyanion concentrations higher than 400 μg/L. The conditions and settings used for ICP-MS analysis and the method for gel phase analysis has been described previously (19). The gel phase analysis was done by disrupting the beads by sonication in an EDTA solution.

For low initial oxyanion concentrations (i.e., 4.00 to 400 μg/L), both the initial and the final dissolved concentrations in the solution for each batch example were measured. The isotopes used for the analysis were $^{31}$P, $^{77}$Se, $^{53}$Cr, $^{75}$As, and $^{57}$Fe. The interference from carbon present in both solution (from acetate) and gel (from EDTA and sodium alginate) phase for chromium at mass 52 ($^{12}$C-$^{40}$Ar) and at mass 53 ($^{13}$C-$^{40}$Ar) were found to be insignificant. There were no other matrix effects that interfered with ICP-MS analysis. All samples were measured with ICP-MS in 1% $HNO_3$ solution.

Figure 6:
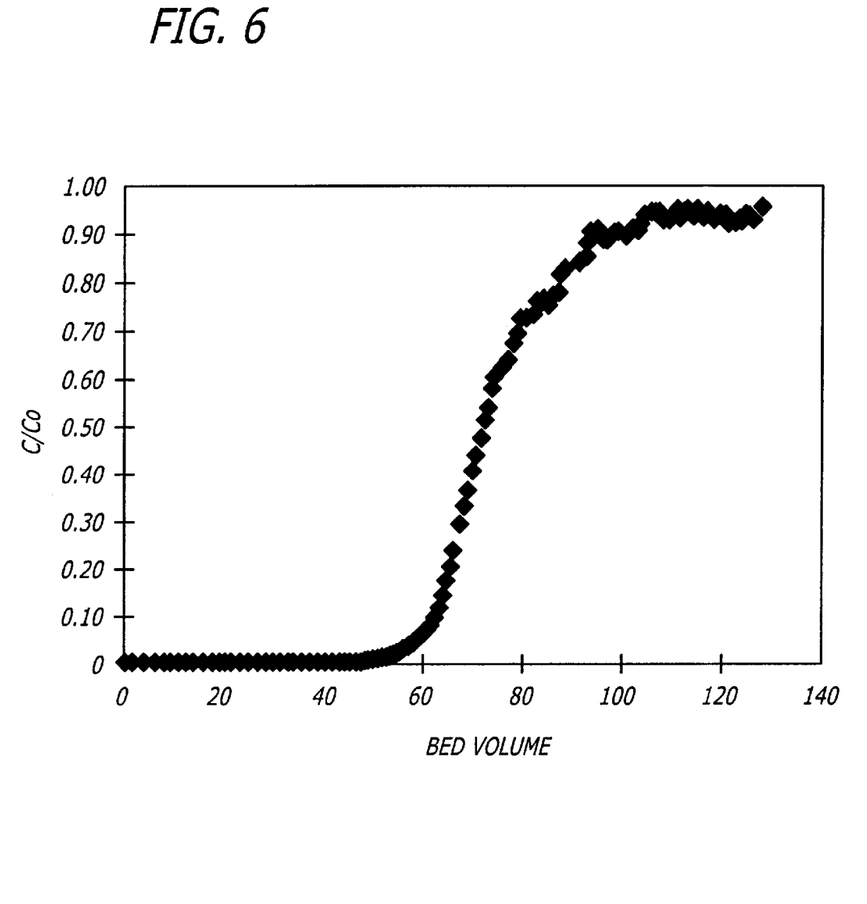

Batch sorption studies with As(V) and Se(IV). Batch sorption studies were conducted to establish the sorption capacity of the Ca—Fe gel beads and their affinity for the anionic contaminants As(V), Se(IV), and Cr(VI). Sorption examples were conducted at pH 4, which is a preferred value considering both the stability of the Ca—Fe beads and the efficiency of anion sorption (see 19). A range of pH from 3 to 5 may be acceptable depending on the efficiency of contaminant removal required. The breakthrough curve for sorption of As(V) to the Ca—Fe alginate gel beads is shown in FIG. 6.

Figure 4:
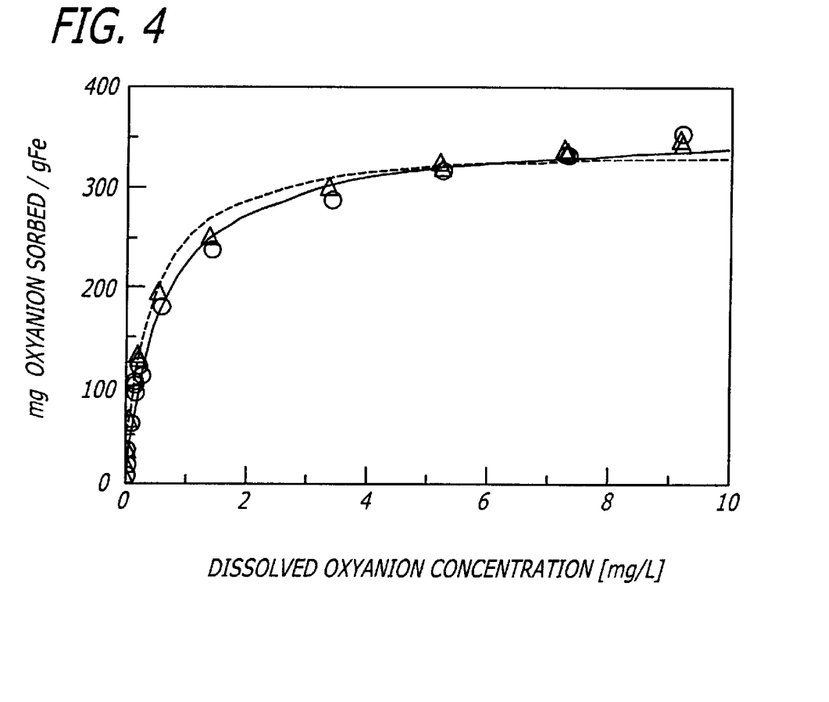
FIG. 4. Sorption of As(V) and Se(IV) normalized to Fe content as a function of the dissolved oxyanion concentration in mg/L. Sorption experiments were conducted at pH 4 in 5 mM $NaNO_3$, 0.5 mM acetic acid with 5 Ca—Fe gel beads (containing 25 μg Fe per bead) shown for As(V) (O) and Se(IV) (Δ), lines show model fit for As(—) and Se(IV) (---).

The Ca—Fe gel beads exhibited comparable sorption properties for As(V) and Se(IV). The sorption of these oxyanions over a range in initial concentration from 1 μg/L to 10 mg/L (corresponding to a total mass of As(V) or Se(IV) of up to 500 μg) after a 120-hr equilibration with 5 Ca—Fe gel beads (i.e., a total mass of Fe(III) of 125 μg) is shown in FIG. 4. The sorbed anion concentration (normalized to Fe content), $\{anion\}_{sorb}$ (in mg anion/g Fe), could be modeled by assuming equilibrium partitioning of the anions between the aqueous and gel phases with a single anion-binding site in the gel phase described by a conditional affinity constant K (in L/mg) and a maximum sorption capacity $\{AlgFe\}_T$ (in mg anion/g Fe), that is:

$$\{anion\}_{sorb} = \frac{K[anion]_{diss}\{AlgFe\}_T}{1 + K[anion]_{diss}}$$

where $[anion]_{diss}$ is the equilibrium dissolved concentration of As(V) or Se(IV) in mg/L. The maximum sorption capacities, $\{AlgFe\}_T$, obtained by fitting the As(V) and Se(IV) sorption data were comparable, 352 mg As(V)/g Fe and 343 Se(IV)/g Fe; the value of the affinity constant K was slightly higher for Se(IV), 2.59 L/mg, than for As(V), 1.68 L/mg.

Figure 5:
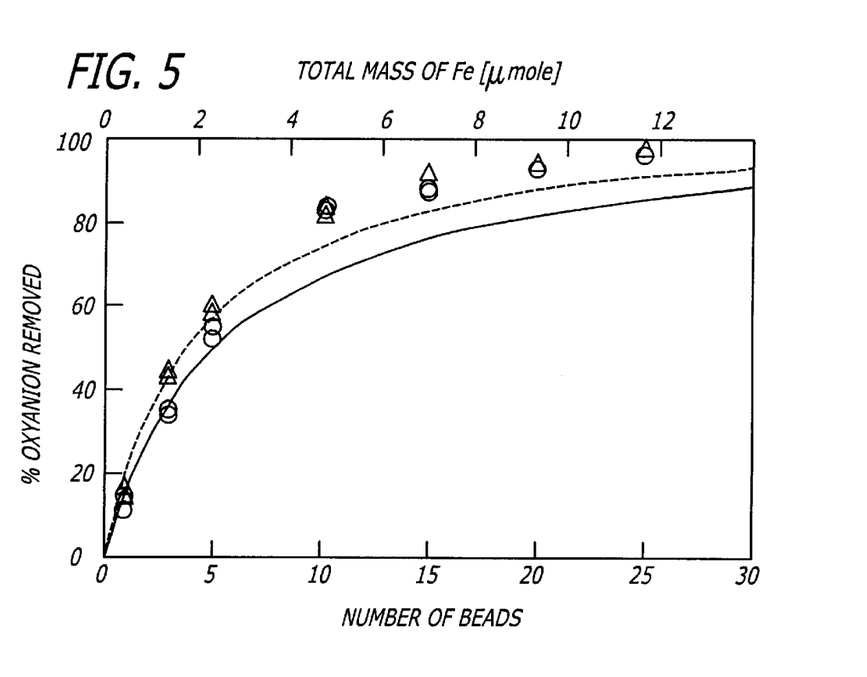
FIG. 5. Efficiency of oxyanion removal as a function of total Fe content or number of Ca—Fe gel beads (containing 25 μg Fe per bead) shown for As(V)(O) and Se(IV) (Δ). Lines show model fit for As(—) and Se(IV)(---). Sorption experiments were conducted at pH 4 in 5 mM $NaNO_3$, 0.5 mM acetic acid with initial oxyanion concentrations of 400 μg/L, a 50 mL reaction volume, and an equilibration time of 120 hr.

These parameters were also used to predict the extent of As(V) or Se(IV) removal as a function of the total iron content of the system, which could be increased by increasing the number of Ca—Fe gel beads used. As shown in FIG. 5, the model predictions were in good agreement with the observed extent anion removal (for initial anion concentrations of 400 μg/L and an equilibration time of 120 hr). The fractional anion removal can be related to the total Fe concentration, $[Fe]_T$ in mg/L, by the expression $$\% \text{ anion removed} = \frac{K\{AlgFe\}_T[Fe]_T}{K\{AlgFe\}_T[Fe]_T + 1 + K[anion]_{diss}} \times 100$$

Up to 95% removal of As(V) or Se(IV) was achieved with higher numbers of beads (i.e., using 25 Ca—Fe beads or a total mass of Fe(III) of 625 μg); under these conditions, the model underpredicted the actual removal by about 10–15%.

Kinetics of As(V), Se(IV), and Cr(VI) sorption in batch studies. Sorption of Cr(VI) by the Ca—Fe gel beads differed from sorption of As(V) and Se(IV). Cr(VI) was only weakly sorbed by the Ca—Fe gel beads and the equilibration was incomplete even after the 120-hr reaction time allowed. The Ca—Fe gel beads are not an efficient sorbent for Cr(VI) removal.

For As(V) and Se(IV), equilibration was largely complete after 120 hr for the initial anion concentrations of 4 mg/L. Although, at the lower initial anion concentrations of 0.4 mg/L, the extent of anion sorption was still increasing slightly at 120 hr, this reaction time was chosen as representing nearly complete equilibration of the system.

In order to reach the maximum sorption capacity of the Ca—Fe gel beads, the sorbing anions must penetrate through the entire volume of the 2-mm diameter gel beads. The uniform distribution of As(V) and Se(IV) in the saturated beads has been demonstrated in electron microprobe studies (20). Previous studies of $Cu^{2+}$ sorption by Ca gel beads have suggested that the kinetics of the sorption process are limited by diffusion within the gel matrix (21). Diffusion limitation is also suggested by the observed correlation between the dissolved sorbate concentration and the square root of time. Accordingly, the time scale for the sorption process can be shortened by using smaller gel beads.

Column studies of As(V) removal from aqueous solution. Efficient removal of As(V) from solution was accomplished in a column study with a residence time of approximately one hour. A fairly sharp breakthrough curve was obtained with a column packed with about 1000 Ca—Fe gel beads and run with an influent As(V) concentration of 40 mg/L. Initial breakthrough was observed at 54 bed volumes and the ratio of effluent to influent As(V) concentration reached 0.5 after 72 bed volumes. Based on the maximum sorption capacity determined from batch experiments (352 mg As(V)/g Fe) and the amount of Fe in the Ca—Fe gel beads packed in the column (1017 beads at 25 μg Fe per bead or 0.025 g Fe), the predicted capacity of the column would be 8.8 mg As(V). With an influent concentration of 40 mg/L As(V) and a bed volume of 3.17 mL, the calculated column capacity would be reached at 71 bed volumes in good agreement with the observed breakthrough curve. Analysis of the spent Ca—Fe gel beads from the column after the experiment showed slightly higher uptake (402 mg As(V)/g Fe) than the apparent maximum sorption capacity determined in the batch studies (352 mg As(V)/g Fe).

Desorption kinetics and regeneration. The kinetics of As(V) desorption from saturated Ca—Fe gel beads were examined in a sequential batch experiment in which the saturated beads were periodically exposed to fresh As(V)-free medium. The experiment was run at pH 7 to favor desorption. Desorption kinetics were observed to be slow. Regeneration of the spent Ca—Fe beads under these conditions would not be practical. Although As(V) desorption from the beads would also be favored at low pH (ca. pH 2), the instability of the Ca—Fe gel beads under these conditions, specifically the release of Fe from the beads, prohibits regeneration at low pH (19, 22, 23).

Although regeneration is not likely to be efficient, dehydration of the spent beads yields a solid of greatly reduced volume that is suitable for disposal. The contaminant is retained in the dehydrated gel matrix and the necessity for disposal of contaminated regenerant solution is eliminated. The polymer itself is environmentally benign and, since it is derived from kelp, the cost of large-scale production of the Ca—Fe beads is low enough to allow their disposal after a single use.

Other factors affecting the use of Ca—Fe beads for removal of anionic contaminants. The sorption properties and the stability of the Ca—Fe gel beads are pH dependent (19). The pH of industrial wastestreams can be highly variable. Accordingly, adjustment of the pH to approximately 3–5 should be included as the initial step in a treatment process using Ca—Fe beads. A pH of about 4 is preferred. Industrial wastestreams may also vary significantly in their ionic strength and in the concentrations of major or trace elements in addition to the oxyanionic contaminants. Batch studies were conducted to examine the effects of ionic strength (up to 0.5 M $NaNO_3$) and the presence of various cations ($Ca^{2+}$, $Pb^{2+}$, and $Cu^{2+}$) on sorption of As(V) by the Ca—Fe gel beads. Only minor effects of these variables on the performance of the Ca—Fe gel beads was observed; high concentrations of $Ca^{2+}$ (1.6 g Ca/L) resulted in slight improvement in As(V) removal.

Some non-hazardous anionic species, however, have been observed to compete significantly with As(V) and Se(IV) for binding sites in the Ca—Fe gel. The sorption of phosphate was comparable to that of As(V) and Se(IV) and high concentrations of dissolved phosphate inhibited As(V) and Se(IV) sorption. This competitive effect was significant when the total anion concentration was high enough to saturate the sorption capacity of the Ca—Fe gel beads.

Finally, the oxidation state of the anionic contaminant is an important variable which affects removal efficiency. In contrast to the sorption behavior observed with As(V) and Se(IV), very poor removal was observed with As(III) or Se(VI) (19).

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

BIBLIOGRAPHY

1. Brewster, M. D. and Passmore, R. J. (1994) Use of electrochemical iron generation for removing heavy-metals from contaminated groundwater. *Environ. Prog.* 13, 143–148.
2. Mariner, P. E., Holzmer, F. J., Jackson, R. E., Meinardus, H. W., and Wolf, F. G. (1996) Effects of high pH on arsenic mobility in a shallow sandy aquifer and on aquifer permeability along the adjacent shoreline, Commencement-Bay-Superfund-site, Tacoma, Washington. *Environ. Sci. Tech.* 30, 1645–1651.
3. Gilles, D. G. and Loehr, R. C. (1994) Waste generation and minimization in the semiconductor industry. *J. Environ. Eng. ASCE* 120, 72–86.
4. Vagliasindi, F. G. A. and Poulsom, S. R. (1994) Waste generation and management in the semiconductor industry: A case study. *Wat. Sci. Tech.* 29, 331–341.
5. United States Environmental Protection Agency (1982) Development Document for Effluent Limitations, Guidelines and Standards for the Electrical and Electronics Components Point Source Category, EPA/440//1-82/075-b, July.
6. Harper, T. R. and Kingham, N. W. (1992) Removal of arsenic from waste-water using chemical precipitation methods. *Wat. Environ. Res.* 64, 200–203.
7. Huang, C. P. and Fu, P. L. K. (1984) Treatment of arsenic(V)-containing water by the activated carbon process. *J. Wat. Pollut. Control. Fed.* 56, 233–242.
8. Huang, C. P. and Vane, L. M. (1989) Enhancing $As^{5+}$ removal by a $Fe^{2+}$-treated activated carbon. *J. Wat. Pollut. Control* 61, 1596–1603.
9. Diamadopoulos, E., Ioannidis, S. and Sakellaropoulos, G. P. (1993) As(V) removal from aqueous solutions by fly ash. *Wat. Res.* 27, 1773–1777.
10. Bierley, J. A. (1990) Biotechnology for the extractive metals industries. *JOM* 42, 28–30.
11. Deans, J. R. and Dixon, B. G. (1992) Uptake of $Pb^{2+}$ and $Cu^{2+}$ by novel biopolymers. *Wat. Res.* 26, 469–472.
12. Hassan, R. M., Ikeda, Y. and Tomiyasu, H. (1993) Alginate polyelectrolyte ionotropic gels. Part XV. Physical properties of uranyl alginate complex especially the chemical equilibrium and electrical conductivity related toe the coordination geometry. *J. Mater. Sci.* 28, 5143–5147.
13. Jang, L. K., Geesey, G. G., Lopez, S. L., Eastman, S. L. and Wichlacz, P. L. (1990) Use of gel-forming biopolymer directly dispenses into a loop fluidized bed reactor to recover dissolved copper. *Wat. Res.* 24, 889–897.
14. Jellinek, H. H. G. and Sangal, S. P. (1972) Complexation of metal ions with natural polyelectrolytes—Removal and recovery of metal ions from polluted waters. *Wat. Res.* 6, 305–314.
15. Konishi, Y., Asai, S., Shimaoka, J., Miyata, M. and Kawamura, T. (1992) Recovery of neodymium and ytterbium by biopolymer gel particles of alginic acid. *Ind. Eng. Chem. Res.* 31, 2303–2311.
16. Torma, A. E., Barnes, J. M., McNew, E. B. and Apel, M. L. (1991) Sorption of radium-226 and heavy metals by biopolymer gels, BED-vol. 21. *Bioprocess Engineering Symposium, ASME*, pp. 65–70.
17. Jang, L. K., Lopez, S. L., Eastman, S. L. and Pryfogle, P. (1991) Recovery of copper and cobalt by biopolymer gels. *Biotechnol. Bioeng.* 37, 266–273.
18. Mikkelsen, A. and Elgsaeter, A. (1995) Density distribution of calcium-induced alginate gels. A numerical study. *Biopolymers* 36, 17–41.
19. Min, J. H., Hering, J. G. (1998) Arsenate Sorption by Fe(III)-Doped Alginate Gels. *Wat. Res.* Vol. 32, No. 5, pp. 1544–1552.
20. Min, J. H. (1997) Removal of Arsenic, Selenium, and Chromium(VI) from Wastewater using Fe(III)-Doped Alginate Gel Sorbent, Ph.D. Thesis, University of California, Los Angeles, Dept. of Civil and Environmental Engineering.
21. Jang, L. K. (1994) Diffusivity of $Cu^{2+}$ in Calcium Alginate Gel Beads. *Biotechnol. Bioeng.* 43(2) 183–185.
22. Jang, L. K., Harpt, N., Uyen, T., Grasmick, D. and Geesey, G. G. (1989) An interactive procedure based on the donnan equilibrium for calculating the polymer-subphase volume of alginic acid. *J Polym. Sci. Part BPolym. Phys.* 27, 1301–1315.
23. Jang, L. K., Nguyen, D. and Geesey G. G. (1995) Effect of pH on the absorption of Cu(II) by alginate gel. *Wat. Res.* 29, 315–321.

What is claimed is:

1. A method for removing oxyanionic pollutants from polluted water, said method comprising the steps of:
    contacting polluted water which comprises oxyanionic pollutants at a polluting concentration with a sufficient amount of a sorption media for a sufficient time to substantially reduce the amount of oxyanionic pollutants in said polluted water, said sorption media comprising calcium alginate which is doped with ferric iron, wherein the amount of ferric iron present in said sorption media is between about 0.5 percent and about 4 percent by weight of the total wet weight of said sorption media; and separating said water with reduced concentration of oxyanionic pollutants from said sorption media.

2. A method for removing oxyanionic pollutants from polluted water according to claim 1 wherein said calcium alginate which is doped with ferric iron is in the form of beads having a diameter of between about 1 and 6 millimeters.

3. A method for removing oxyanionic pollutants from polluted water according to claim 1 wherein said polluted water is contacted with said sorption media as a batch and said water having reduced pollutants is separated from said sorption media as a batch.

4. A method for removing oxyanionic pollutants from polluted water according to claim 3 wherein said calcium alginate which is doped with ferric iron is in the form of beads having a diameter of between about 1 and 6 millimeters.

5. A method for removing oxyanionic pollutants from polluted water according to claim 1 wherein said polluted water is continuously introduced into contact with said sorption media and said water having reduced concentration of pollutants is continuously separated from said sorption media.

6. A method for removing oxyanionic pollutants from polluted water according to claim 5 wherein said calcium alginate which is doped with ferric iron is in the form of beads having a diameter of between about 1 and 6 millimeters.

7. A method for removing oxyanionic pollutants from polluted water according to claim 1, said method comprising the additional step of dehydrating said sorption media after said sorption media has been separated from said water with reduced pollutants to form a disposable waste product.

8. A method for removing oxyanionic pollutants from polluted water according to claim 1 wherein said oxyanion pollutants in said polluted water are selected from the group consisting of arsenic (V) oxyanions and selenium (IV) oxyanions.

* * * * *